US011948413B2

(12) United States Patent
Pedro

(10) Patent No.: US 11,948,413 B2
(45) Date of Patent: Apr. 2, 2024

(54) DIGITAL BIOMETRIC DOOR LOCKS

(71) Applicant: Paul Pedro, Endicott, NY (US)

(72) Inventor: Paul Pedro, Endicott, NY (US)

( * ) Notice: Subject to any disclaimer, the term of this patent is extended or adjusted under 35 U.S.C. 154(b) by 58 days.

(21) Appl. No.: 17/584,861

(22) Filed: Jan. 26, 2022

(65) Prior Publication Data

US 2022/0237967 A1 Jul. 28, 2022

Related U.S. Application Data

(60) Provisional application No. 63/142,946, filed on Jan. 28, 2021.

(51) Int. Cl.
*G07C 9/27* (2020.01)
*G07C 9/00* (2020.01)

(52) U.S. Cl.
CPC ..... *G07C 9/00563* (2013.01); *G07C 9/00309* (2013.01); *G07C 9/00896* (2013.01); *G07C 2209/62* (2013.01)

(58) Field of Classification Search
CPC ............ G07C 2209/62; G07C 9/00309; G07C 9/00563; G07C 9/00896; G07C 9/00944; G07C 9/22; G07C 9/00571; G07C 2009/00642; G07C 2009/0092; G07C 9/0069; G07C 9/38; G07C 1/10; G07C 2009/00587; G07C 2009/0065; G07C 2009/00769; G07C 2009/00865; G07C 9/00174; G07C 9/00182; G07C 9/00817; G07C 9/00857; G07C 9/215; G07C 9/27; G07C 9/28; G07C 9/32; G07C 9/33; G07C 9/37; E05B 47/0012; E05B 2047/0058; E05B 17/10; E05B 2047/0067; E05B 2047/0069; E05B 2047/0095; E05B 39/005; E05B 47/0003; E05B 67/10; E05B 79/20; E05B 81/54; E05B 81/77; E05B 83/26; E05B 85/12; E05B 13/004; E05B 2047/0024; E05B 2047/003;

(Continued)

(56) References Cited

U.S. PATENT DOCUMENTS

2004/0183652 A1* 9/2004 Deng ................ G07C 9/00563 70/277
2016/0117878 A1* 4/2016 Pececnik ............ G07C 9/00571 340/5.53

(Continued)

*Primary Examiner* — Dionne Pendleton
(74) *Attorney, Agent, or Firm* — Brennan, Manna & Diamond, LLC

(57) ABSTRACT

The present invention relates to fingerprint scanner-based door locks. The invention proposes potential embodiments of the door locks, wherein a first embodiment includes a fingerprint scanner with a key card system and a second embodiment includes a fingerprint scanner with a number pad lock. The fingerprint scanner is used for receiving a fingerprint and is associated with an LED that is illuminated in a specific color indicating the status of authorization of the received fingerprint. Door locks of the first embodiment can be configured to be connected to a communication network of a hotel or resort in which the locks are installed using a central software. Door locks of the second embodiment can be configured to be connected to a smartphone application for configuration. The door locks include control and processing circuitry for authorization of a scanned fingerprint and received key card/PIN.

18 Claims, 4 Drawing Sheets

(58) Field of Classification Search
CPC ........... E05B 47/0673; E05B 2045/063; E05B 2045/0665; E05B 2045/0695; E05B 2047/0017; E05B 45/06; E05B 47/0001; E05B 47/026; E05B 15/022; E05B 19/0011; E05B 2045/065; E05B 2045/067; E05B 2047/0018; E05B 2047/0068; E05B 2047/0088; E05B 27/00; E05B 35/001; E05B 35/007; E05B 45/04; E05B 47/0047; E05B 49/006; E05B 55/005; E05B 59/00; E05B 63/244; E05B 65/00; H04W 4/029; H04W 4/80; H04W 8/22; H04W 8/245; H04L 67/12; H04L 67/125; H04L 67/52; G08C 17/02; G08B 13/06; G07F 17/13; G07F 9/002; G07F 9/009; G07F 9/026; G07F 9/105; G06Q 10/063114; G06Q 10/06395; G06Q 10/06398; G06Q 10/0832; G06Q 10/0836; G06Q 10/1091; G06Q 20/4015; G06Q 20/405; G06Q 40/125; G06F 21/32; G05B 2219/50333; A47G 2029/142; A47G 2029/147; A47G 2029/149; A47G 29/141; A47G 29/20
See application file for complete search history.

(56) References Cited

U.S. PATENT DOCUMENTS

| | | | | |
|---|---|---|---|---|
| 2017/0009491 | A1* | 1/2017 | Nguyen | G07C 9/00563 |
| 2021/0133686 | A1* | 5/2021 | Theobald | G06Q 10/06398 |
| 2022/0198863 | A1* | 6/2022 | Ho | G07C 9/00571 |

* cited by examiner

DIGITAL BIOMETRIC DOOR LOCKS

CROSS-REFERENCE TO RELATED APPLICATION

The present application claims priority to, and the benefit of, U.S. Provisional Application No. 63/142,946, which was filed on Jan. 28, 2021 and is incorporated herein by reference in its entirety.

FIELD OF THE INVENTION

The present invention relates generally to the field of door locks. More specifically, the invention relates to a digital door lock capable of receiving a fingerprint to authorize entry. One embodiment includes a fingerprint scanner with a key card system and another embodiment includes a fingerprint scanner with a number pad lock. The door lock of the present invention replaces standard locks with keys and keycards in homes and hotels, thereby maximizing security to prevent unauthorized entry into the area. Accordingly, the present disclosure makes specific reference thereto. Nonetheless, it is to be appreciated that aspects of the present invention are also equally applicable to other like applications, devices and methods of manufacture.

BACKGROUND

By way of background, door locks are used virtually everywhere to restrict access to a physical location or to a secured system. Door locks such as mechanical locks, keycard systems, key based locks, number pad locks and other similar types of locks are often used at the doors of hotels, residential properties, and more, to prevent any unauthorized access to homes, hotels, etc. The standard door locks in a hotel, home residence, etc. can be easily picked or broken, or tampered with, thereby leading to intrusion and potential injury or theft. Therefore, the standard locks are ineffective at preventing unauthorized entry to a property and cause loss to the users/property owners.

With the traditional key or key card-based locks, individuals are required to carry keys or key cards in order to access the locks. The individuals are required to keep the keys or key cards safe while travelling, as in case the key or key card is accidently lost, individuals may be unable to open the lock, and may fail to access their home, hotel room or other property. Further, individuals are required to arrange a duplicate key or key cards.

These typical locks are essentially insecure. A fundamental problem with granting access to a secured physical location or to a secured system using such locks is that anyone in possession of the instrumentality of access (a conventional key, an electronic access security card, for example) can be granted access to the secured location or system.

Also, in keypad-based locks, individuals need to remember the access code, but these are often forgotten by them. Further, the number of different PINs and passwords a person has to remember seems to increase daily. Therefore, using one or two easy-to-remember passwords for all services becomes the norm. That, in itself, is insecure since PIN codes and passwords that are easy to remember are also more easily obtained surreptitiously. Individuals need a lock that can provide an alternative way of authorization and eliminates need to remember the PIN of the locks.

In hotels and resorts, each lock is configured individually which is not only time consuming but laborious. Individuals require an access system that allows them to centrally configure unlocking means of door locks by connecting the locks to an internal network of the hotels and resorts.

Therefore, there exists a long felt need in the art for a door lock that replaces standard locks that presently utilize keys and keycard-based authorization. There is also a long felt need in the art for an improved door lock that maximizes security to prevent unauthorized entry into an area. Additionally, there is a long felt need in the art for an improved door lock that obviates the use of keys for unlocking the lock. Moreover, there is a long felt need in the art for a door lock that eliminates the need to remember a PIN to access the locks. Further, there is a long felt need in the art for a lock that does not allow anyone in possession of the instrumentality of access to gain access to the secured location or system. Furthermore, there is a long felt need in the art for locks that can be tied to an organization's network for central configuration and monitoring. Finally, there is a long felt need in the art for an improved door lock that offers a much safer method of preventing unauthorized entry into a secured area.

The subject matter disclosed and claimed herein, in one embodiment thereof, comprises a digital biometric door lock system. The door lock system includes a door lock mounted to a door and the door lock includes a fingerprint scanner configured to obtain a fingerprint sample from a user, and a key card slot configured to receive a key card having an access code from a user. The system also includes a central software module for configuring one or more registered fingerprint samples and one or more registered access codes for unlocking the door lock wherein the one or more registered fingerprint samples and one or more registered access codes are configured on the door lock for a specific time period and for authentication. The obtained fingerprint sample is compared with the one or more registered fingerprint samples and the received access code is compared with the one or more registered access codes for providing access to the user.

In this manner, the digital biometric door lock system and the door lock of the present invention accomplishes all of the forgoing objectives and provides users with an improved door lock capable of receiving a thumb or fingerprint to authorize entry, thus obviating the need to remember passwords and carry keys. The door lock is tied to the network of the organization using a central software and provides a much safer method of preventing unauthorized entry into a secured area.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a combined fingerprint and key card system door lock. The door lock is configured to replace standard locks operable with keys and keycards. The door lock further comprising a fingerprint scanner configured to obtain a fingerprint sample from a user, a key card slot configured to receive a key card having an access code from a user, control and processing circuitry, coupled to the fingerprint scanner and the key card slot, and configured to verify an identity of the user by comparing the fingerprint sample to one or more registered fingerprint samples stored on integrated memory and by comparing the access code to a registered access code stored on the integrated memory of the lock.

The subject matter disclosed and claimed herein, in one embodiment thereof, comprises a combined fingerprint and key card system door lock. The door lock further comprising a fingerprint scanner configured to obtain a fingerprint sample from a user, a key card slot configured to receive a key card having an access code from a user, control and processing circuitry, coupled to the fingerprint scanner and the key card slot, and configured to verify an identity of the user by comparing the fingerprint sample to one or more registered fingerprint samples stored on integrated memory.

In yet another embodiment, a fingerprint authorization-based door lock is disclosed. The door lock includes a fingerprint scanner configured to obtain a fingerprint sample from a user, an illumination region coupled to a light emitting diode (LED) for illuminating in a specific color indicating authorization status of the obtained fingerprint sample, a key card slot configured to receive a key card having an access code from a user, a rotatable handle or knob for rotating a latch to unlock the lock only when the fingerprint sample is authorized, wherein the authorization is performed by a control and processing circuitry.

In yet another embodiment, an access system using a door lock is disclosed. The system includes a door lock mounted to a door wherein the door includes a fingerprint scanner configured to obtain a fingerprint sample from a user, a key card slot configured to receive a key card having an access code associated with a user. The system also includes a central software module for configuring one or more registered fingerprint samples and one or more registered access codes for unlocking the door lock wherein the one or more registered fingerprint samples and one or more registered access codes are configured on the door lock for a specific time period and for authentication. The obtained fingerprint sample is compared with the one or more registered fingerprint samples and the received access code is compared with the one or more registered access codes for providing access to the user.

The subject matter disclosed and claimed herein, in one embodiment thereof, comprises a combined fingerprint and keypad door lock. The door lock further comprising a fingerprint scanner configured to obtain a fingerprint sample from a user, an illumination region coupled to an LED for illuminating in a specific color indicating authorization status of the obtained fingerprint sample, a keypad configured to receive a PIN from a user, a control and processing circuitry coupled to the fingerprint scanner and the keypad configured to verify an identity of the user by comparing the fingerprint sample to one or more registered fingerprint samples stored on integrated memory and by comparing the PIN to one or more registered PIN stored on integrated memory of the lock.

In yet another embodiment, the combined fingerprint and keypad door lock includes a display for displaying the received PIN from the keypad.

In yet another embodiment, the combined fingerprint and keypad door lock is configured to couple to a door lock software application using a wireless channel.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
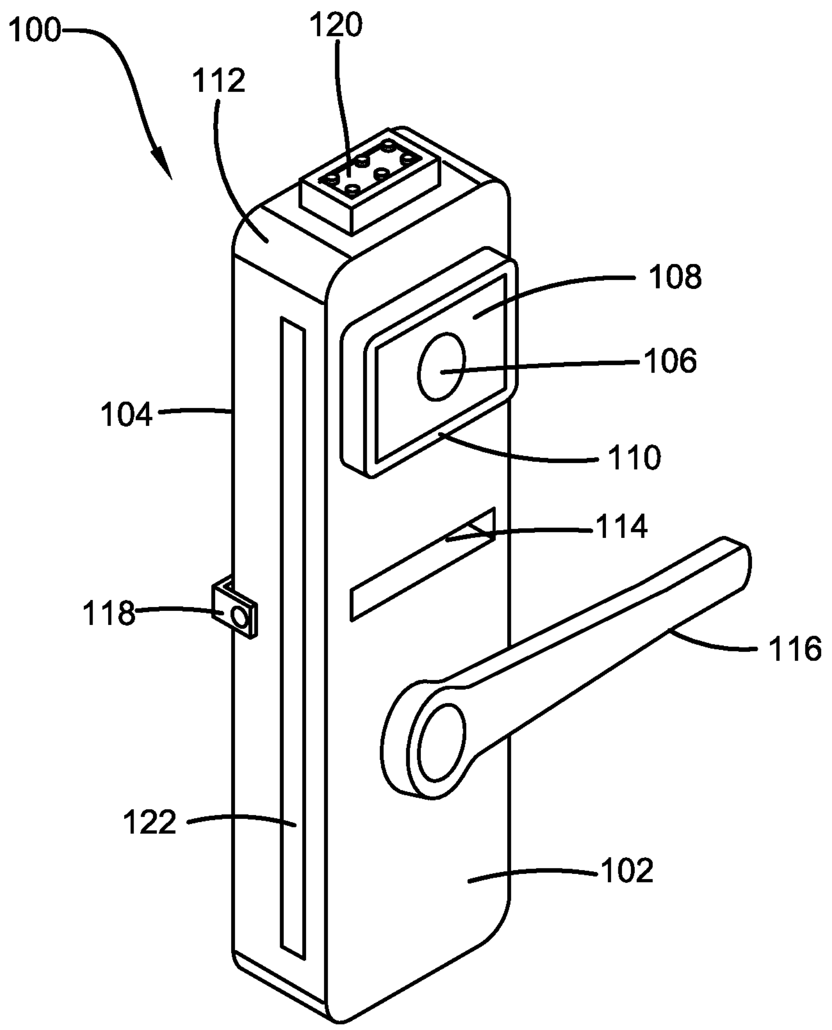
FIG. 1 illustrates a perspective view of one potential embodiment of a digital biometric door lock of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long felt need in the art for a door lock that replaces standard locks that presently utilize keys and keycards-based authorization. There is also a long felt need in the art for an improved door lock that maximizes security to prevent unauthorized entry into an area. Additionally, there is a long felt need in the art for an improved door lock that obviates the use of keys for unlocking the lock. Moreover, there is a long felt need in the art for a door lock that eliminates the need to remember a PIN to access the locks. Further, there is a long felt need in the art for a lock that does not allow anyone in possession of the instrumentality of access to gain access to the secured location or system. Furthermore, there is a long felt need in the art for locks that can be tied to an organization's network for central configuration and monitoring. Finally, there is a long felt need in the art for an improved door lock that offers a much safer method of preventing unauthorized entry into a secured area.

The present invention, in one exemplary embodiment, is a novel and combined fingerprint and key card system door lock. The door lock is configured to replace standard locks that presently utilize keys and keycards. The door lock further comprising a fingerprint scanner configured to obtain a fingerprint sample from a user, a key card slot configured to receive a key card having an access code from a user, a control and processing circuitry coupled to the fingerprint scanner and the key card slot and configured to verify an identity of the user by comparing the fingerprint sample to one or more registered fingerprint samples stored in integrated memory and by comparing the access code to a registered access code stored in integrated memory of the lock.

Referring initially to the drawings, FIG. 1 illustrates a perspective view of one potential embodiment of the digital biometric door lock of the present invention in accordance with the disclosed architecture. The biometric door lock 100 of the present embodiment is configured, in one exemplary arrangement, for hotels and resorts for maximizing security by preventing unauthorized entry into an area. The door lock 100 includes a front surface 102 and an opposite rear surface 104 with the door lock 100 adhered to a door using the rear surface 104 such that the front surface 102 is accessible to a user for using the door lock 100.

More specifically, the door lock 100 includes a fingerprint scanner 106 disposed on the front surface 102 and is used for scanning a fingerprint of a thumb or finger of a user for authentication. The fingerprint scanner 106 is surrounded by an illuminating surface 108 that illuminates in a specific color indicating the status of the fingerprint authentication of a user. The illuminating surface 108 includes an LED light 110 that can illuminate in red color when fingerprint authentication is unsuccessful and can illuminate in green color indicating a successful fingerprint authentication of a user. During the process of fingerprint authentication, the LED light 110 can illuminate in yellow color to signal that the battery may be running low. The fingerprint scanner 106 is designed to scan a fingerprint in less than three seconds for a safe and quick authentication process. The fingerprint scanner 106 eliminates opening of the door on which the lock 100 is mounted by an unauthorized person as the registered fingerprint acts as a key for the lock 100 to open. The door lock 100 includes an integrated memory 112 for storing one or more registered fingerprints that are used for comparison with the scanned fingerprint for authentication of a user for unlocking the lock 100. The comparison is performed by the control and processing circuitry 122 of the door lock 100. The fingerprints are registered using a central software controlling the door lock 100 as described best in FIG. 2.

The door lock 100 can further include a key card slot 114 for receiving and scanning a hotel magnetic strip card (key card) for allowing access to a user. The key card slot 114 is configured for recognizing access credentials for the door lock 100 using the control and processing circuitry 122. The integrated memory 112 stores the registered access code or credentials for unlocking the door. It should be appreciated that the key card slot 114 can be a swipe slot which requires the key card to be swiped in the slot 114 or an insert slot which requires the key card to be inserted in the slot 114.

The fingerprint scanner 106 and the key card slot 114 eliminate use of a traditional key into a lock for gaining access. Further, the key card slot 114 recognizes the access credential that can be in the form of an access code and the fingerprint scanner 106 recognizes the authorized fingerprint for access.

The door lock 100 includes a rotating handle or knob 116 configured for rotating a latch 118 positioned on a rear surface 104 of the lock 100. The manual rotation of the handle or knob 116 is only possible when a fingerprint scanner 106 is successfully authenticated or an access code is correctly recognized by the key card slot 114. The latch 118 is connected internally to both the fingerprint scanner 106 and the key card slot 114. The door lock 100 includes a battery 120 for operating the LED 110 and other components such as the fingerprint scanner 106.

Figure 2:
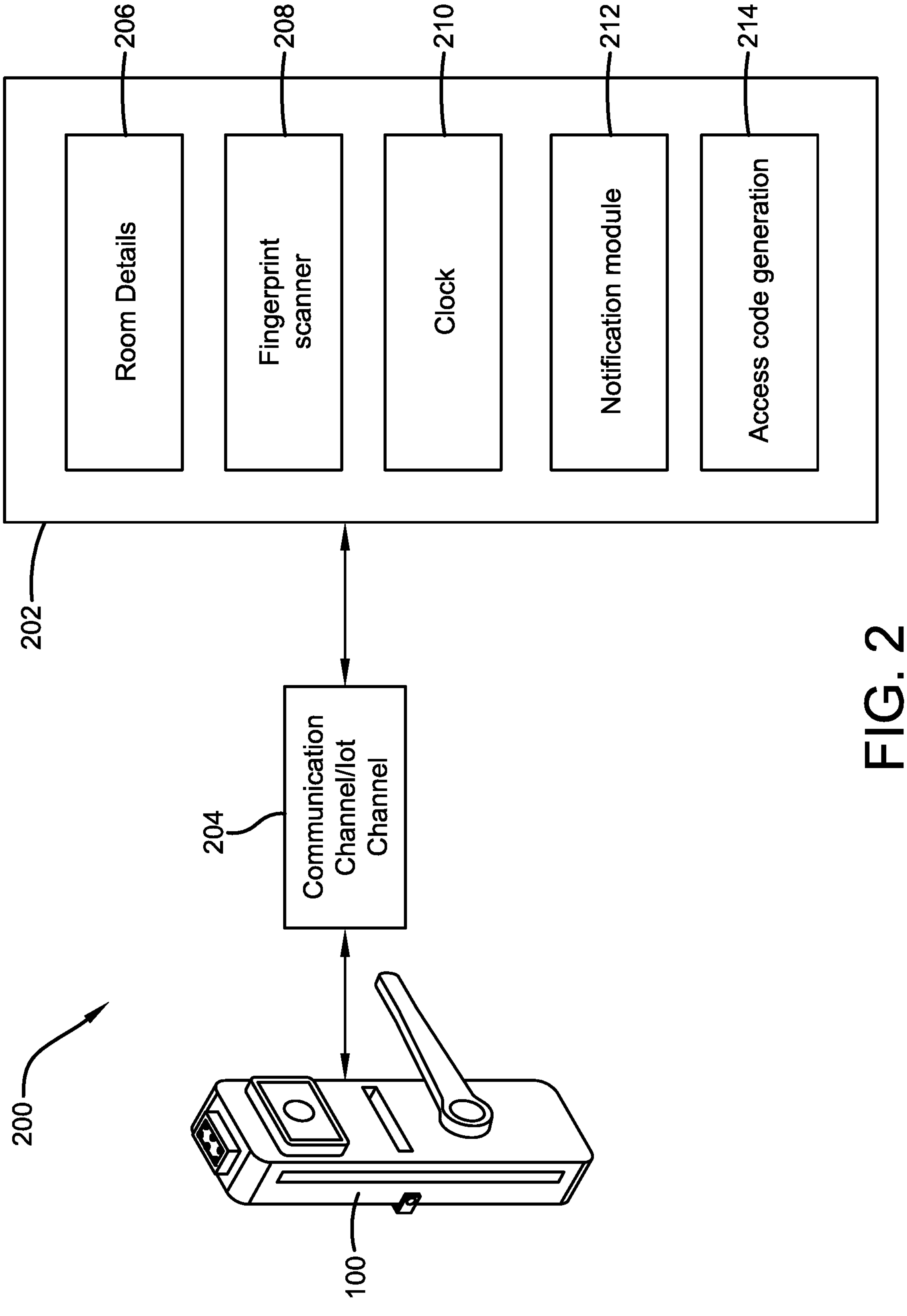
FIG. 2 illustrates a schematic view showing a complete security system using the digital biometric door lock of FIG. 1 with a central software for registration of a fingerprint in accordance with the disclosed architecture.

FIG. 2 illustrates a schematic view showing a complete security system 200 using the digital biometric door lock 100 of FIG. 1 with a central software 202 for registration of a fingerprint in accordance with the disclosed architecture. A central software module 202 is configured to be used with the door lock 100 of the first embodiment of the present invention for registering authorized fingerprints for a specific door lock 100. More specifically, a communication channel or an Internet of Things (IoT) communication channel 204 can be used for communication between the door lock 100 and the software module 202. The software module 202 also includes an associated hardware module such as a fingerprint scanner 208 that is used for scanning a fingerprint for registration for a specific door lock.

The software module 202 is preferably accessible at the front desk of a hotel or resort where the fingerprint scanner 208 is used for scanning the fingerprint of a user or customer. Along with the fingerprint of the user, room details 206 including room number, floor number, and other information can also be included. The software module 202 tags one or more fingerprints to a door lock for a limited duration, thereby providing access to a user for a limited time. This is useful in cases where a room is simultaneously allocated to more than one user, or when a room is sequentially allocated to another user after the room has been vacated by a first user(s). A virtual clock 210 can be used for setting or correlating fingerprints with an authentication time duration. The authentication time duration can range from few hours to few months.

A notification module 212 is used for notifying hotel authorities when a threshold number of incorrect attempts are made to unlock a door lock. This helps authorities to take an appropriate action and also helps in recording incorrect access attempts. The software module 202 is used for generating access codes that are used for encoding key cards for unlocking door locks using the access code generation module 214.

The communication channel 204 can be of any local area network (LAN), metropolitan area network (MAN), wide area network (WAN), a public data network (e.g., the Internet), short range wireless network and the like, or any combination thereof. In addition, the wireless network can be, for example, a cellular network and can employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), Zigbee, Wi-Fi Direct, wireless LAN (WLAN), Bluetooth®, mobile ad-hoc network (MANET) and the like, or any combination thereof.

Figure 3:
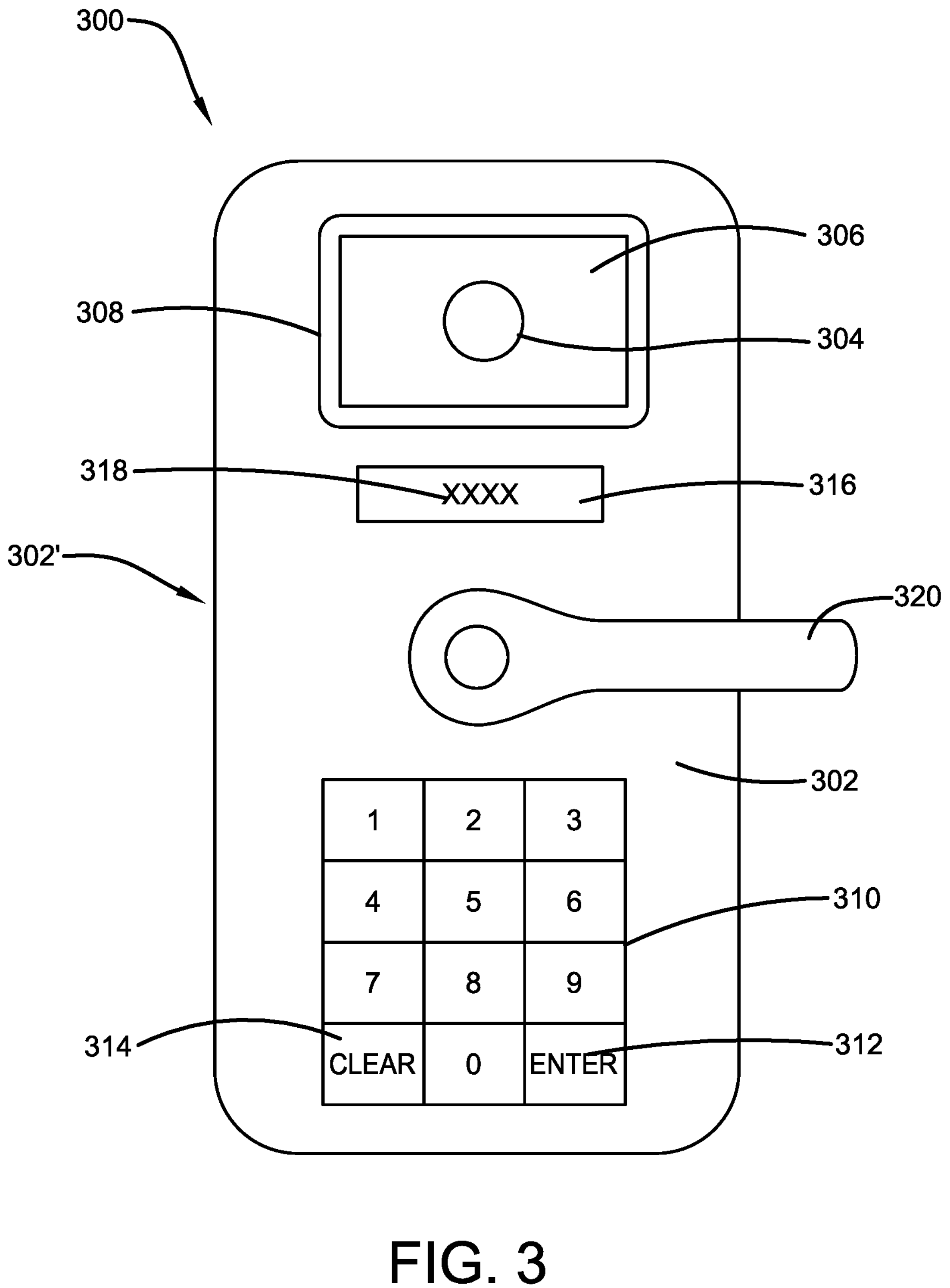
FIG. 3 illustrates a front perspective view of a second embodiment of the digital biometric door lock of the present invention made for homes and personal use in accordance with the disclosed architecture.

FIG. 3 illustrates a front perspective view of a second embodiment of the digital biometric door lock of the present invention made for homes and personal use in accordance with the disclosed architecture. As shown, the keypad and biometric based door lock 300 of the present embodiment includes a front surface 302 and a rear surface 302'. The door lock 300 includes a fingerprint scanner 304 that can be used for scanning a fingerprint of a thumb or finger of a user for authentication. The fingerprint scanner 304 is surrounded by an illuminating surface 306 that illuminates in a specific color indicating the status of fingerprint authentication of a user. The illuminating surface 306 includes an LED light 308 that can illuminate in red color when fingerprint authentication is unsuccessful and can illuminate in green color indicating a successful fingerprint authentication of a user. During the process of fingerprint authentication, the LED light 308 can illuminate in yellow color signaling, for example, that the battery is running low. The fingerprint scanner 304 is designed to scan a fingerprint in less than five seconds for a safe and quick authentication process.

The door lock 300 includes a keypad 310 that is used for entering an access code or PIN for unlocking the lock 300. The PIN entered by a user using the keypad 310 is compared with a preconfigured PIN or access code for unlocking the lock 300. The keypad 310 can include an Enter button 312 that is enabled for submitting the entered PIN and a clear button 314 erases the entered PIN, thereby enabling a user to enter the correct PIN in case a wrong PIN is entered.

The door lock 300 includes a digital display 316 for displaying the entered PIN 318 and also for displaying an optional message such as "Successful" or "Unsuccessful". In cases where an incorrect PIN is entered for a specific number of times such as five times, the door lock 300 can be subsequently unlocked only using the fingerprint scanner 304.

The door lock 300 includes a rotating handle or knob 320 configured for rotating a latch (not shown) positioned on the rear surface 302' of the lock 300. The manual rotation of the handle or knob 320 is only possible when the fingerprint scanner 304 is successfully authenticated or a PIN is correctly entered. The door lock 300 includes a memory 322 for storing one or more registered PINs and fingerprints used for authentication by a control circuitry of the lock 300.

Figure 4:
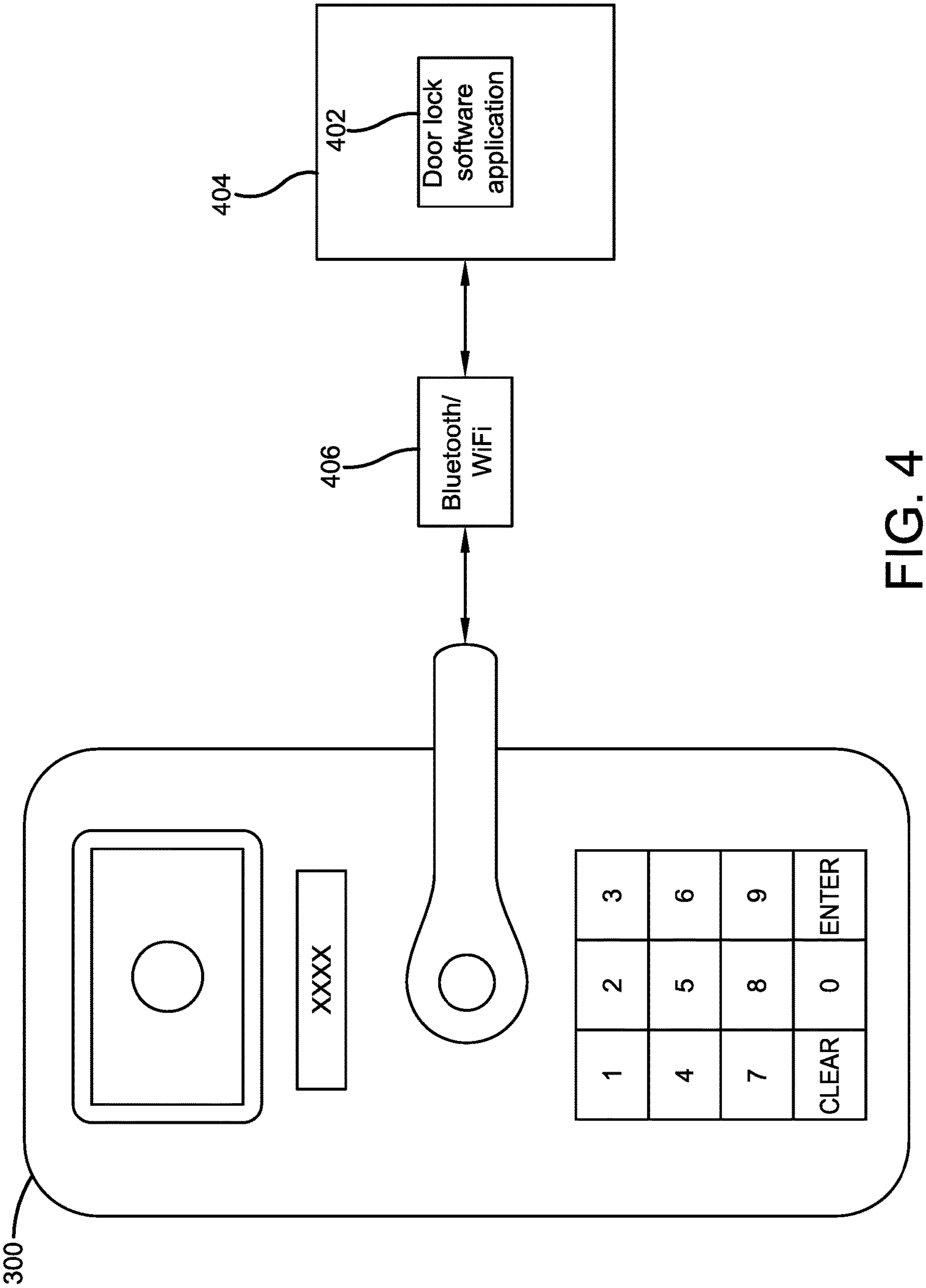
FIG. 4 illustrates a schematic view showing connection of the door lock of FIG. 3 with a door lock software application installed in an electronic device in accordance with the disclosed architecture.

FIG. 4 illustrates a schematic view showing the connection of the door lock 300 of FIG. 3 with a door lock software application installed in an electronic device in accordance with the disclosed architecture. The door lock 300 can be coupled to a smartphone application 402 installed in an electronic device 404 through a Wi-Fi, Wi-Fi Direct, Zigbee, Bluetooth or any other wireless connection 406. The smartphone application 402 can be used for configuring an access code or PIN that can be used for unlocking the door lock 300.

The smartphone application 402 can be designed to control and monitor more than one door lock 300 and receives notifications when an incorrect attempt of access is made on the door lock 300. Further, the application 402 can be used for registering an authorized fingerprint that can be used for matching with a fingerprint scanned by the fingerprint scanner 304 of the lock 300.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "door lock", "digital biometric door lock", "biometric door lock", "lock", and "keypad and biometric based door lock" are interchangeable and refer to the digital biometric door lock 100,300 of the present invention.

Notwithstanding the forgoing, the digital biometric door lock 100,300 of the present invention can be of any suitable size and configuration as is known in the art without affecting the overall concept of the invention, provided that it accomplishes the above-stated objectives. One of ordinary skill in the art will appreciate that the digital biometric door lock 100,300 as shown in the FIGS. are for illustrative purposes only, and that many other sizes and shapes of the digital biometric door lock 100,300 are well within the scope of the present disclosure. Although the dimensions of the digital biometric door lock 100,300 are important design parameters for user convenience, the digital biometric door lock 100,300 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A biometric door lock for preventing unauthorized entry into an area, the biometric door lock comprising:

a front surface and an opposing rear surface, wherein said front surface is accessible to a user for using said biometric door lock;

a fingerprint scanner disposed on said front surface for scanning a fingerprint of the user for authentication;

an illuminating surface proximal to said fingerprint scanner for illuminating a multitude of colors indicating a status of a fingerprint authentication of the user;

an integrated memory for storing one or more registered fingerprints that are used for a comparison with said scanned fingerprint authentication of the user for unlocking said biometric door lock;

a control and processing circuitry for conducting said comparison, wherein a first fingerprint and a second fingerprint of the user is registered using a central software controlling said biometric door lock, and further wherein said first fingerprint and said second fingerprint are registered simultaneously to said biometric door lock;

a virtual clock for correlating at least one of the one or more registered fingerprints with a predetermined authentication time duration, wherein the scanned fingerprint, after authentication from a comparison with the correlated registered fingerprints, is used for unlocking said biometric door lock within the predetermined authentication time duration; and a rotating handle configured for rotating a latch positioned on said rear surface, wherein a rotation of said rotating handle is enabled when said scanned fingerprint authentication is successful, and wherein the latch is internally coupled to the fingerprint scanner and a key card slot configured to receive and scan a magnetic strip key card for another authentication of the user.

2. The biometric door lock of claim 1, wherein said illuminating surface includes an LED light that illuminates in a red color when said scanned fingerprint authentication is unsuccessful, and wherein said LED light illuminates in a green color when said scanned fingerprint authentication is successful.

3. The biometric door lock of claim 2 further comprising a battery, wherein said LED light illuminates in a yellow color when the battery is running low.

4. The biometric door lock of claim 1, wherein said key card slot is configured for recognizing access credentials for the biometric door lock using said control and processing circuitry.

5. The biometric door lock of claim 4, wherein said key card slot is selected from a group consisting of a swipe slot and an insert slot.

6. The biometric door lock of claim 1 further comprising a battery for powering the LED light.

7. The biometric door lock of claim 6, wherein the battery also powers the fingerprint scanner.

8. The biometric door lock of claim 7 further comprising a keypad for entering said registered access code for unlocking said biometric door lock.

9. The biometric door lock of claim 1, wherein said comparison with said scanned fingerprint authentication of the user for unlocking said biometric door lock includes an authentication time duration.

10. A biometric door lock for preventing unauthorized entry into an area, the biometric door lock comprising:

a front surface and an opposing rear surface, wherein said front surface is accessible to a user for using said biometric door lock;

a fingerprint scanner disposed on said front surface for scanning a fingerprint of the user for authentication;

an illuminating surface proximal to said fingerprint scanner for illuminating a multitude of colors indicating a status of a fingerprint authentication of the user;

an integrated memory for storing one or more registered fingerprints of the user that are used for a comparison with said scanned fingerprint authentication of the user for unlocking said biometric door lock;

a control and processing circuitry for conducting said comparison;

a central software having a first fingerprint of the user registered therein;

a key card slot for receiving and scanning a magnetic strip key card for another authentication of the user, wherein said key card slot is configured for recognizing access credentials for said biometric door lock using said control and processing circuitry;

a virtual clock for correlating at least one of the one or more registered fingerprints with a predetermined authentication time duration, wherein the scanned fingerprint, after authentication from a comparison with the correlated registered fingerprints, is used for unlocking said biometric door lock within the predetermined authentication time duration; and a rotating handle configured for rotating a latch positioned on said rear surface, wherein a rotation of said rotating handle is enabled when said scanned fingerprint authentication is successful, and wherein the latch is internally coupled to the fingerprint scanner and the key card slot configured to receive and scan a magnetic strip key card for another authentication of the user.

11. The biometric door lock of claim 10, wherein said illuminating surface includes an LED light that illuminates in a red color when said scanned fingerprint authentication is unsuccessful, and wherein said LED light illuminates in a green color when said scanned fingerprint authentication is successful.

12. The biometric door lock of claim 11 further comprising a battery, wherein said LED light illuminates in a yellow color when said battery is running low.

13. The biometric door lock of claim 11 further comprising a battery for operating said LED light and said fingerprint scanner.

14. The biometric door lock of claim 10, wherein said key card slot is selected from a group consisting of a swipe slot and an insert slot.

15. The biometric door lock of claim 10, wherein said comparison with said scanned fingerprint authentication of the user for unlocking said biometric door lock includes an authentication time duration.

16. A biometric door lock for preventing unauthorized entry into an area, the biometric door lock comprising:

a front surface and an opposing rear surface, wherein said front surface is accessible to a user for using said door lock;

a fingerprint scanner disposed on said front surface for scanning a fingerprint of the user for authentication;

an illuminating surface proximal to said fingerprint scanner for illuminating a multitude of colors indicating a status of a fingerprint authentication of the user;

an integrated memory for storing one or more registered fingerprints that are used for a comparison with said scanned fingerprint authentication of the user for unlocking said biometric door lock;

a control and processing circuitry of said biometric door lock for conducting said comparison;

a central software controlling said biometric door lock and comprising a first fingerprint registered to the user;

said integrated memory storing a registered access code for unlocking said biometric door lock;

a keypad for entering said registered access code for unlocking said biometric door lock;

a virtual clock for correlating at least one of the one or more registered fingerprints with a predetermined authentication time duration, wherein the scanned fingerprint, after authentication from a comparison with the correlated registered fingerprints, is used for unlocking said biometric door lock within the predetermined authentication time duration; and a rotating handle configured for rotating a latch positioned on said rear surface, wherein a rotation of said rotating handle is enabled when said scanned fingerprint authentication is successful, and wherein the latch is internally coupled to the fingerprint scanner and a key card slot configured to receive and scan a magnetic strip key card for another authentication of the user.

17. The biometric door lock of claim 16, wherein said illuminating surface includes an LED light that illuminates in a red color when said scanned fingerprint authentication is unsuccessful, and wherein said LED light illuminates in a green color when said scanned fingerprint authentication is successful.

18. The biometric door lock of claim 17, wherein said comparison with said scanned fingerprint authentication of the user for unlocking said biometric door lock includes an authentication time duration.

* * * * *